(No Model.)

C. G. KRIKORIAN.
KNOCKDOWN BOX.

No. 391,538. Patented Oct. 23, 1888.

WITNESSES:
Phil C. Dieterich
C. Sedgwick

INVENTOR.
C. G. Krikorian
BY Munn & Co.
ATTORNEY.

N. PETERS, Photo-Lithographer, Washington, D. C.

UNITED STATES PATENT OFFICE.

CASBAR G. KRIKORIAN, OF SMYRNA, TURKEY.

KNOCKDOWN BOX.

SPECIFICATION forming part of Letters Patent No. 391,538, dated October 23, 1888.

Application filed August 18, 1888. Serial No. 283,076. (No model.)

*To all whom it may concern:*

Be it known that I, CASBAR G. KRIKORIAN, of Smyrna, Turkey, have invented a new and Improved Knockdown Box, of which the following is a full, clear, and exact description.

My invention relates to an improvement in boxes especially adapted to that character of box known as a "knockdown" box, and has for its object to provide a receptacle for the exhibition and transportation of fruit—such as figs, grapes, prunes, &c.—wherein when the box is used for transportation it may be effectually sealed to protect the contents, and wherein, also, when the box has arrived at its destination, the top, sides, and ends may be thrown down, so as to effectually expose the contents upon all sides to the view of the prospective customer.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
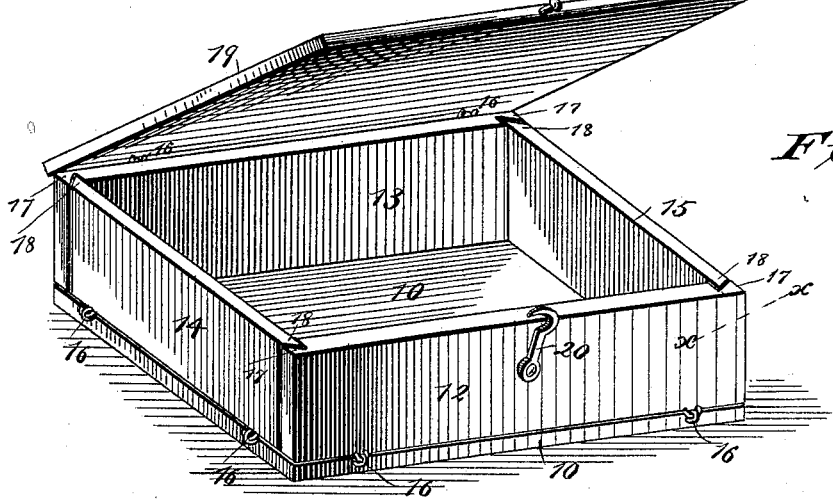
Figure 2:
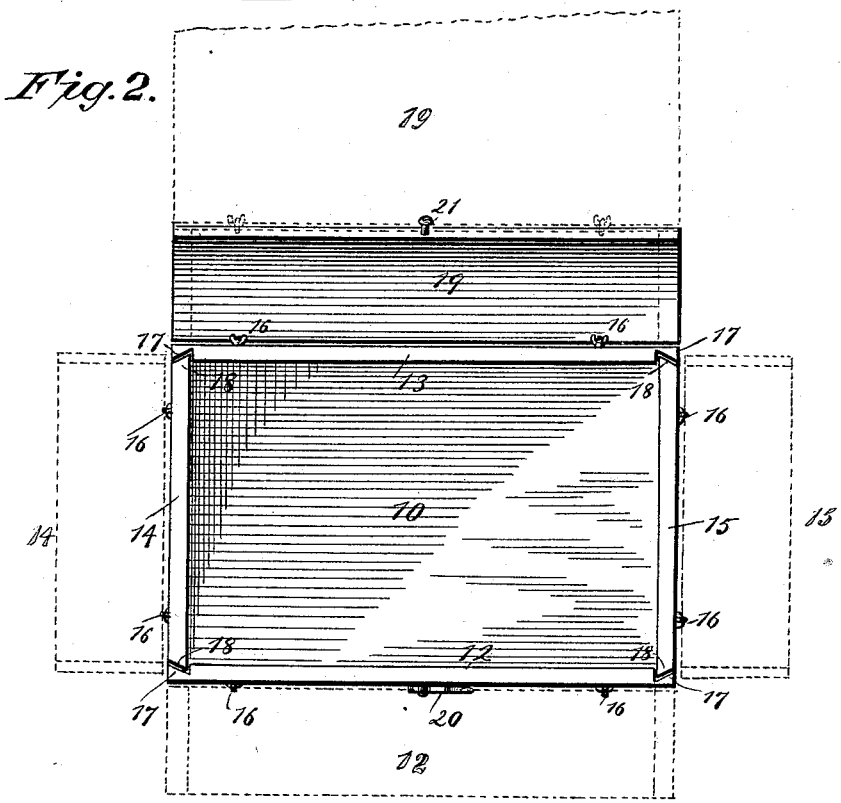

Figure 1 is a perspective view of the box as it is used for transportation, with the lid partially open. Fig. 2 is a plan view of the same, illustrating in dotted lines the position of the several parts when the contents of the box are on exhibition; and Fig. 3 is a horizontal section on line *x x* of Fig. 1.

In carrying out the invention the box is adapted to be constructed of wood, metal, or other material, but preferably of wood; and it consists of a bottom, 10, to which parallel sides 12 and 13 are hinged and likewise hinged ends 14 and 15. The sides and ends are so hinged to the bottom that when they are thrown up at right angles to the bottom they will rest upon the upper face of the same. The hinge employed usually consists of interlocking staples or eyes 16, which staples or eyes are respectively attached to the bottom, the sides, and the ends, as best shown in Fig. 1.

Figure 3:
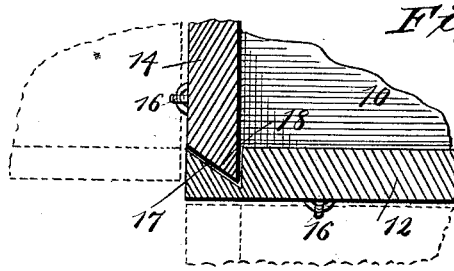

The inner faces of the sides 12 and 13, near their extremities, are provided with a mortised recess, 17, as best shown in Fig. 3, which recesses are adapted to receive the inclined or beveled ends 18 of the respective end pieces, 14 and 15. The lid 19 is hinged to one of the sides at the top, the said lid being adapted to fold down upon the upper edges of the sides and ends, and being retained in a horizontal position through the medium of a hook or equivalent device, 20, pivoted to the outer face of one side engaging a pin or equivalent keeper, 21, forming a portion of the lid, as best shown in Fig. 1.

The box being in open position, (illustrated in dotted lines in Fig. 2,) and it being desired to build the same up to receive the fruit for shipment, the end pieces, 14 and 15, are first carried vertically upward at right angles to the bottom resting upon the same. The sides 12 and 13 are then brought to a similar position, the beveled extremities of the end pieces entering the vertical mortised recesses 13 of the sides. The fruit may now be packed in the box and the lid pressed downward upon the same until it assumes a horizontal position, whereupon the catch 20, pivoted to the side 12, is made to engage the pin 21 upon the lid, effectually holding the same closed.

When the fruit has arrived at its destination, to inspect the same the latch 20 is disengaged, whereupon the lid and the side to which the lid is hinged may be thrown down in essentially the same plane with the bottom, as illustrated in dotted lines in Fig. 2, the opposite side and the ends being made to assume a like position. By this means each side and likewise the top of the fruit or other material packed in the box are exposed to view and may be readily inspected.

It is obvious that the parts may be carried upward to the position illustrated in Fig. 1 and the lid closed at any time in an expeditious and convenient manner.

I do not confine myself to any particular form of hinge nor to any particular form of catch.

Having thus described my invention, what I claim as new, and desire to secure by Letters Patent, is—

1. In a knockdown box, the combination, with the bottom, of side pieces hinged to the upper face of the same, provided with vertical mortised grooves upon the inner face near the extremities, end pieces also hinged to the upper face of the bottom, having beveled ends adapted to enter the said mortised grooves, a lid hinged to one side piece, and means, substantially as shown and described, for locking the lid in engagement with the sides and ends, as and for the purpose specified.

2. In a knockdown box, the combination, with the bottom, of side pieces hinged to the upper face of the same, having vertical mortised grooves upon the inner face at the extremities, end pieces hinged to the upper face of the bottom, provided with beveled ends adapted to enter the said mortised groove, a lid hinged to one side piece, a catch pivoted to the outer face of the opposite side piece, and a keeper adapted to receive said catch attached to the edge of the lid, substantially as shown and described, whereby the sides, ends, and lid of the box may be made to assume a horizontal position essentially in the same plane with the bottom, or the sides and ends be carried upward to a vertical position at right angles to the bottom, and a lid secured upon said sides and ends, as and for the purpose specified.

CASBAR G. KRIKORIAN.

Witnesses:
 ROUPEN C. AGAZARIAN,
 E. G. CORBETTI.